Patented Nov. 27, 1928.

1,693,055

UNITED STATES PATENT OFFICE.

WALTER SCHOELLER, OF BERLIN-WESTEND, AND KURT SCHMIDT, OF BERLIN-FRIEDE-NAU, GERMANY, ASSIGNORS TO THE FIRM: CHEMISCHE FABRIK AUF ACTIEN, VORM. E. SCHERING, OF BERLIN, GERMANY.

PHARMACEUTICAL PREPARATIONS AND PROCESS OF MAKING SAME.

No Drawing. Application filed July 28, 1927, Serial No. 209,174, and in Germany August 2, 1926.

Our invention refers to chemical products adapted for use in the manufacture of pharmaceutical preparations, and more especially to a hitherto unknown type of iodine-substituted benzo nitrils with a linkage resembling that of phenol ethers, these compounds corresponding to the general formula R—O—R'—CN, wherein R and R' are iodine-substituted aryl radicals. Up till now it has only been possible to effect the condensation of phenol ether halides and potassium phenolate in the presence of pulverulent copper to methoxy phenoxy benzene.

Contrary to all expectations we have now found that it is possible to effect condensation of iodine-substituted phenol ethers with metal salts of iodine-substituted oxybenzo nitrils, without the halogen being split off or the nitril group being destroyed, provided that the reaction mixture be heated to higher temperatures, preferably to 210–240° C. in the presence of a catalyst.

Example 1.

A mixture of 18.5 grams 2.4-diiodine anisol and 21 grams of the potassium salt of the 3.5-diiodine-4-oxybenzonitril are heated during five hours to 220–230° C. in a sealing tube in the presence of 0.2 grams copper bronze (a product known in the trade as "Naturkupfer C" and being a very pure, finely divided form of copper). The contents of the tube having a dark brokn color forms a syrup-like crystalline mass in which no free iodine can be traced, but only potassium iodide. The product of condensation is further treated in such manner that in order to remove the starting materials which may not have entered into combination, the product of reaction is distilled with steam and the residue is recrystallized from alcohol in the presence of an ample quantity of animal charcoal. The 4 (4' methoxy 3' iodo phenoxy) 3.5 diiodo-1-benzonitril

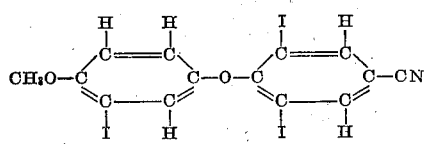

obtained in this manner forms almost colorless microcrystalline scales melting at 154° C. The compound is rather readily soluble in ether, chloroform, and hot alcohol, less so in benzene and cold alcohol, and insoluble in ligroin and water. In dilute alkali the compound does not dissolve, which shows that the nitril group has not suffered saponification during the condensation.

Iodine-substituted benzonitrils with phenol-ether-like linkage can also be obtained by condensing the metal salts of the iodine-substituted phenol ethers with the corresponding iodine-substituted benzonitrils or with the iodine-substituted nitrobenzenes, the products of condensation of these last compounds being reduced in well known manner, for instance with stannous chloride, and, after diazotization, being boiled with cuprous cyanide.

Example 2.

A mixture of 14.4 grams of the potassium salt of the o-iodine methyl ether of hydroquinone and 24 grams 3.4.5-triiodine-1-benzonitril are heated during five hours in the sealing tube to 230° C. with 0.2 grams "Naturkupfer C". Also in this case only potassium iodide could be traced in the reaction product. The contents of the tube is further treated substantially as described with reference to Example 1, and there is also obtained the iodine-substituted benzonitril with phenol-like linkage.

Example 3.

A mixture of 14.4 grams of the potassium salt of the o-iodine methyl ether of hydroquinone and 25 grams 3.4.5-triiodine-1-nitrobenzene are heated during four hours in the presence of 0.2 grams "Nauturkupfer C" to 225–230° C. in a little flask with a rising tube mounted thereon. After cooling the contents of the flask is purified by steam distillation and the uncombined starting materials are removed. Such potassium salt of o-iodine methyl ether which should not have entered into combination, remains in the watery solution, while the triiodine nitrobenzene is removed by recrystallization from absolute alcohol. The 4 (4' methoxy 3' iodo phenoxy) 3.5 diiodo-1-nitrobenzene obtained in this manner is reduced without any further purification to the corresponding amine with the aid of stannous chloride.

To this end 12 grams of this nitrobenzene compound dissolved in 200 ccms. acetone are heated to boiling in a flask with reflux condenser and a hot solution of 15 grams stannous chloride in 30 ccms. of concentrated hydrochloric acid is added to the boiling solution in small portions. After boiling for some minutes after the last portion has been added, the mixture is allowed to cool down and is washed with water and dilute caustic soda solution. The reaction product is recrystallized from acetone. In order to convert this 4-(4'-3'-iodine methoxy phenoxy)-3-5-diiodine-1-aminobenzol into the corresponding nitril, 17 grams of the amine are dissolved in 40 ccms. water and 5.2 grams hydrochloric acid of 1.17 specific gravity, and are diazotized at 0° C. with a solution of 1.8 grams sodium nitrite in 5 ccms. water. This diazo solution is introduced into a solution of 6 grams crystallized copper sulfate in 54 ccms. water, to which has been added a hot solution of 7 grams of a 96 per cent potassium cyanide. The mixture is heated to 90° C. and is then allowed to cool down. The dark brown reaction product, which is somewhat resinified is separated off by filtration and is recrystallized first from glacial acetic acid and then from alcohol in the presence of a large quantity of animal charcoal. The 4-(4'-3'-iodine methoxy phenoxy)-3-5-diiodine-1-benzonitril obtained in this manner is identical with the compound produced in accordance with Example 1.

Various changes may be made in the details disclosed in the foregoing specification without departing from the invention or sacrificing the advantages thereof.

We claim:—

1. The process of producing iodine-substituted benzonitrils having a phenol ether-like linkage of the type R—O—R'—CN, wherein R and R' are iodine-substituted aryl radicals, comprising heating an iodine-substituted phenol ether with a metal salt of an iodine-substituted oxybenzo nitril in the presence of copper to a temperature between 210 and 240° C.

2. The process of producing 4 (4' methoxy 3' iodo phenoxy) 3.5 diiodo-1-benzonitril having the formula

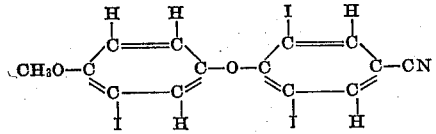

comprising heating a mixture of 2.4-diiodine anisol and the potassium salt of 3.5-diiodine-4-oxybenzonitril during several hours in the presence of finely divided copper to 220–230° C. in a closed vessel.

3. As a new composition of matter, an iodine substituted benzonitril with phenol ether-like linkage of the type R—O—R'—CN, wherein R and R' are iodine-substituted aryl radicals.

4. As a new composition of matter, 4 (4' methoxy 3' iodo phenoxy) 3.5 diiodo-1-benzonitril having the formula

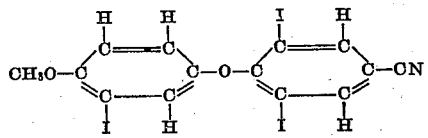

forming almost colorless microcrystalline scales melting at about 154° C. and being soluble in ether, chloroform, and hot alcohol and insoluble in ligroin, water, and a dilute solution of an alkali metal compound.

In testimony whereof we affix our signatures.

WALTER SCHOELLER.
KURT SCHMIDT.